US009900079B2

(12) United States Patent
Thubert et al.

(10) Patent No.: US 9,900,079 B2
(45) Date of Patent: Feb. 20, 2018

(54) RELIABLE CONNECTIONLESS LOW POWER COVERAGE EXTENSION

(71) Applicant: Cisco Technology, Inc., San Jose, CA (US)

(72) Inventors: Pascal Thubert, La Colle sur Loup (FR); Jerome Henry, Pittsboro, NC (US); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 15/075,562

(22) Filed: Mar. 21, 2016

(65) Prior Publication Data

US 2017/0272144 A1 Sep. 21, 2017

(51) Int. Cl.
*H04B 7/14* (2006.01)
*H04L 1/18* (2006.01)
*H04L 5/00* (2006.01)

(52) U.S. Cl.
CPC ............ *H04B 7/14* (2013.01); *H04L 1/1812* (2013.01); *H04L 5/006* (2013.01); *H04L 5/0055* (2013.01)

(58) Field of Classification Search
CPC ...................................................... H04B 7/14
See application file for complete search history.

(56) References Cited

U.S. PATENT DOCUMENTS

| 2012/0113986 A1* | 5/2012 | Shaffer | H04L 1/1854 370/390 |
| 2013/0188562 A1* | 7/2013 | Espina Perez | H04L 1/188 370/328 |

OTHER PUBLICATIONS

S Floyd, V Jacobson, S McCanne, C Liu, and L Zhang. 1995. A reliable multicast framework for light-weight sessions and application level framing. In Proceedings of the conference on Applications, technologies, architectures, and protocols for computer communication (SIGCOMM '95), David Oran (Ed.). ACM, New York, NY, USA, 342-356.*
Levis et al. "Trickle: A Self-Regulating Algorithm for Code Propagation and Maintenance in Wireless Sensor Networks" University of California, Berkeley; pp. 1-15.
IEEE 802.11ah—https://en.wikipedia.org/wiki/IEEE_802.11ah; Wikipedia; Jan. 9, 2016; pp. 1-4.
ISA100.11a Technology Standard; NIVIS wireless sensor networks; 1 page.

(Continued)

*Primary Examiner* — Hassan Kizou
*Assistant Examiner* — Ashil Farahmand
(74) *Attorney, Agent, or Firm* — Parker Ibrahim & Berg LLC; James M. Behmke; Kenneth J. Heywood

(57) ABSTRACT

In one embodiment, a device in a network sets a timer interval based in part on a distance between the device and a backbone of the network. The device receives a unicast communication destined for a remote destination that was sent via broadcast. The device determines a count of receipt acknowledgements of the communication sent by other devices in the network. At the end of the timer interval, the device sends a receipt acknowledgement of the communication via broadcast, in response to the count of receipt acknowledgements sent by other devices in the network being below a threshold amount.

20 Claims, 13 Drawing Sheets

(56) References Cited

OTHER PUBLICATIONS

"Parallel Redundancy Protocol" https://en.wikipedia.org/wiki/Parallel_Redundancy_Protocol; pp. 1-2.
P. Levis et al, "The Trickle Algorithm" Internet Engineering Task Force (IETF); Mar. 2011; pp. 1-13.
LoRa Technology "https://www.lora-alliance.org/What-ls-LoRa/Technology"; 2016; pp. 1-2.

* cited by examiner

RELIABLE CONNECTIONLESS LOW POWER COVERAGE EXTENSION

TECHNICAL FIELD

The present disclosure relates generally to computer networks, and, more particularly, to techniques that provide reliable, connectionless, and low-power coverage extensions in a network.

BACKGROUND

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

The Institute of Electrical and Electronics Engineers (IEEE) 802.11ah standard represents one way to implement an LLN. A key feature of 802.11ah is sub-Gigahertz communications to extend traditional WiFi coverage. 802.11ah also makes use of relay access points that exchange frames with a networking station, to further extend coverage.

While standards such as 802.11ah provide a mechanism to implement certain types of LLNs, such mechanisms may not be suitable for other forms of LLNs. Notably, many industrial networks require very precise timing and reliability (e.g., strictly bounded latency, etc.). For example, a control signal for a stamping machine on an assembly line must reach the stamping machine at a precise time, to ensure that the next stamping action is in sync with the next object to be stamped on the assembly line. However, in 802.11ah and similar mechanisms, devices form a single association with a relay or access point, creating a single point of failure. Further, these mechanisms use a repeat process that rely on automatic repeat requests (ARQs), which may prevent the original message from reaching its destination in time.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
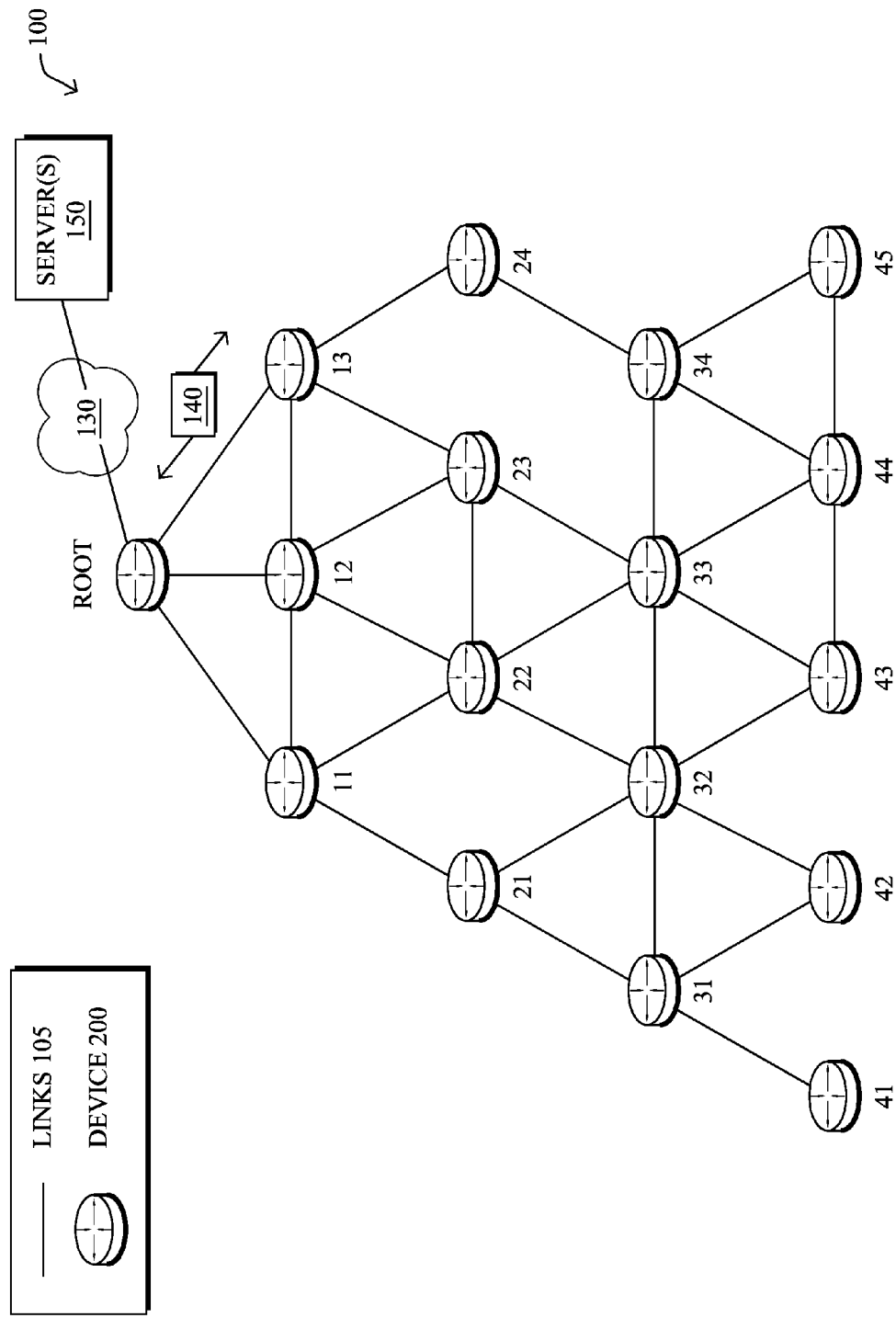
FIG. 1 illustrates an example communication network.

According to one or more embodiments of the disclosure, a device in a network sets a timer interval based in part on a distance between the device and a backbone of the network. The device receives a unicast communication destined for a remote destination that was sent via broadcast. The device determines a count of receipt acknowledgements of the communication sent by other devices in the network. At the end of the timer interval, the device sends a receipt acknowledgement of the communication via broadcast, in response to the count of receipt acknowledgements sent by other devices in the network being below a threshold amount.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, access points, repeaters, sensors, actuators, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a is certain orientation, particularly with a "root" node, the network 100 is merely an example illustration that is not meant to limit the disclosure.

Nodes 200 may communicate with any number of external devices, such as server(s) 150 via a network 130, which may be a WAN in some implementations. For example, a particular node 42 may send sensor data to server 150 for further processing, either via a local network or via a WAN.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
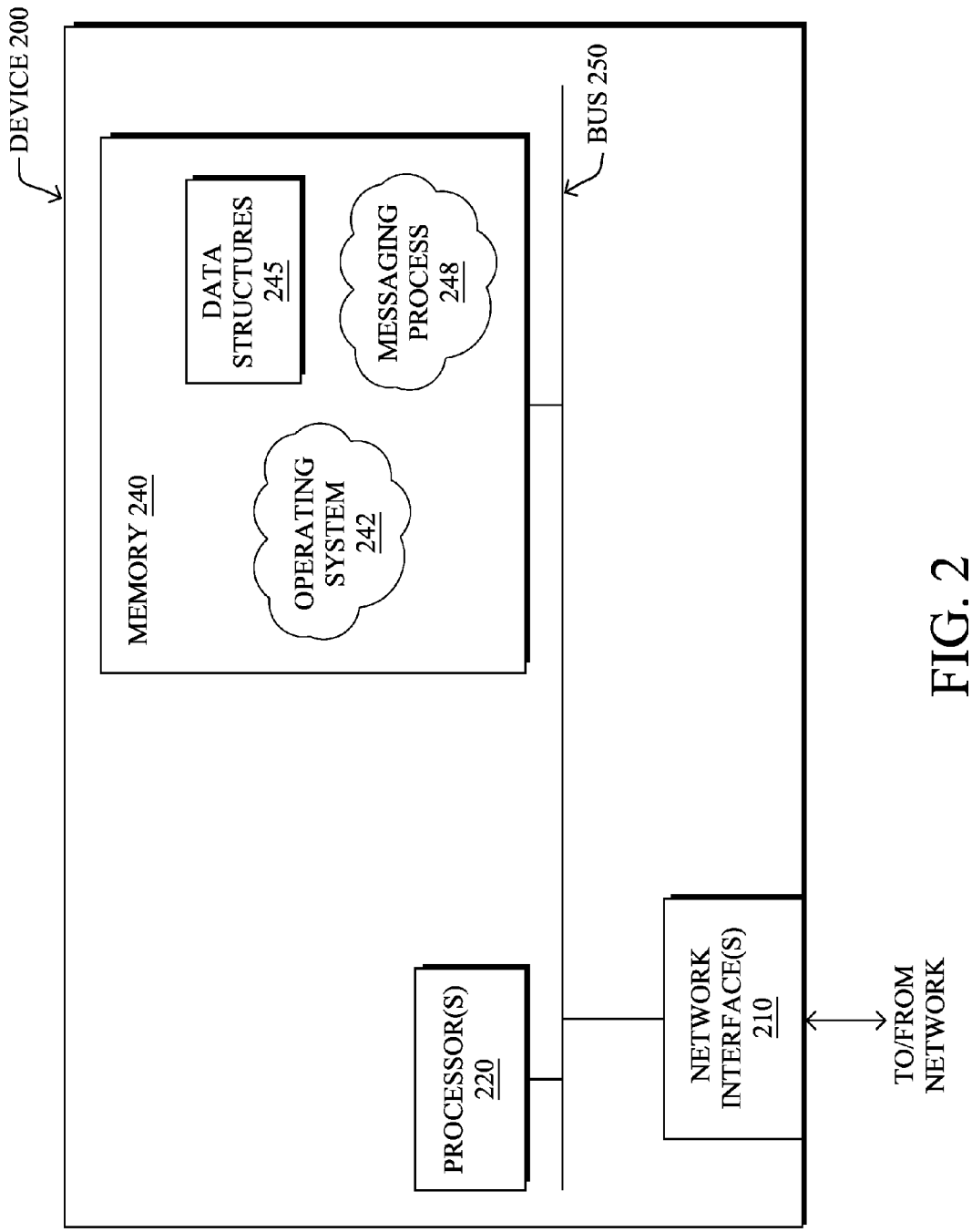
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a messaging process 248, as described herein. Note that while messaging process 248 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

As noted above, IEEE 802.11ah may not be suitable for certain LLN applications, such as industrial applications. Various attempts have been made to address the additional requirements of industrial networks, particularly with respect to ensuring bounded latency. For example, the 100.11a standard by the International Society of Automation (ISA) has the concept of "duocast" whereby a node associates itself with two access points (APs), and the secondary AP copies the packet to the main AP over the wire. While this approach increases reliability, ISA 100.11a also does not support the use of repeaters. Even if ISA 100.11a were extended to a 2-hop setup, the first hop would be unable to use duocast, which was originally defined for 1-hop setups. Another technique, the Parallel Redundancy Protocol (PRP), supports replication and elimination, but also requires the network to establish non-congruent paths using traffic engineering (TE)-style methods, leading to very complex deployments.

Reliable Connectionless Low Power Coverage Extension

The techniques herein allow for the use of range extenders in a network (e.g., an 802.11ah ESS network or the like), while providing reliable, connectionless, and low power communications. In some aspects, communications are sent via broadcast and are propagated in a directed manner towards the destination. For example, the networking device may use a Trickle-based mechanism to propagate the broadcasted message towards its destination. Such a mechanism may be configured to favor certain devices over others (e.g., APs located along the backbone, devices that are closer to the destination, etc.), for purposes of forwarding the communication on towards the destination.

Specifically, according to one or more embodiments of the disclosure as described in detail below, a device in a network sets a timer interval based in part on a distance between the device and a backbone of the network. The device receives a unicast communication destined for a remote destination that was sent via broadcast. The device determines a count of receipt acknowledgements of the communication sent by other devices in the network. At the end of the timer interval, the device sends a receipt acknowledgement of the communication via broadcast, in response to the count of receipt acknowledgements sent by other devices in the network being below a threshold amount.

Illustratively, the techniques described herein may be performed by hardware, software, and/or firmware, such as in accordance with the messaging process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various wired or wireless communication protocols, and as such, may be processed by similar components understood in the art that execute those protocols, accordingly.

Figure 3A:
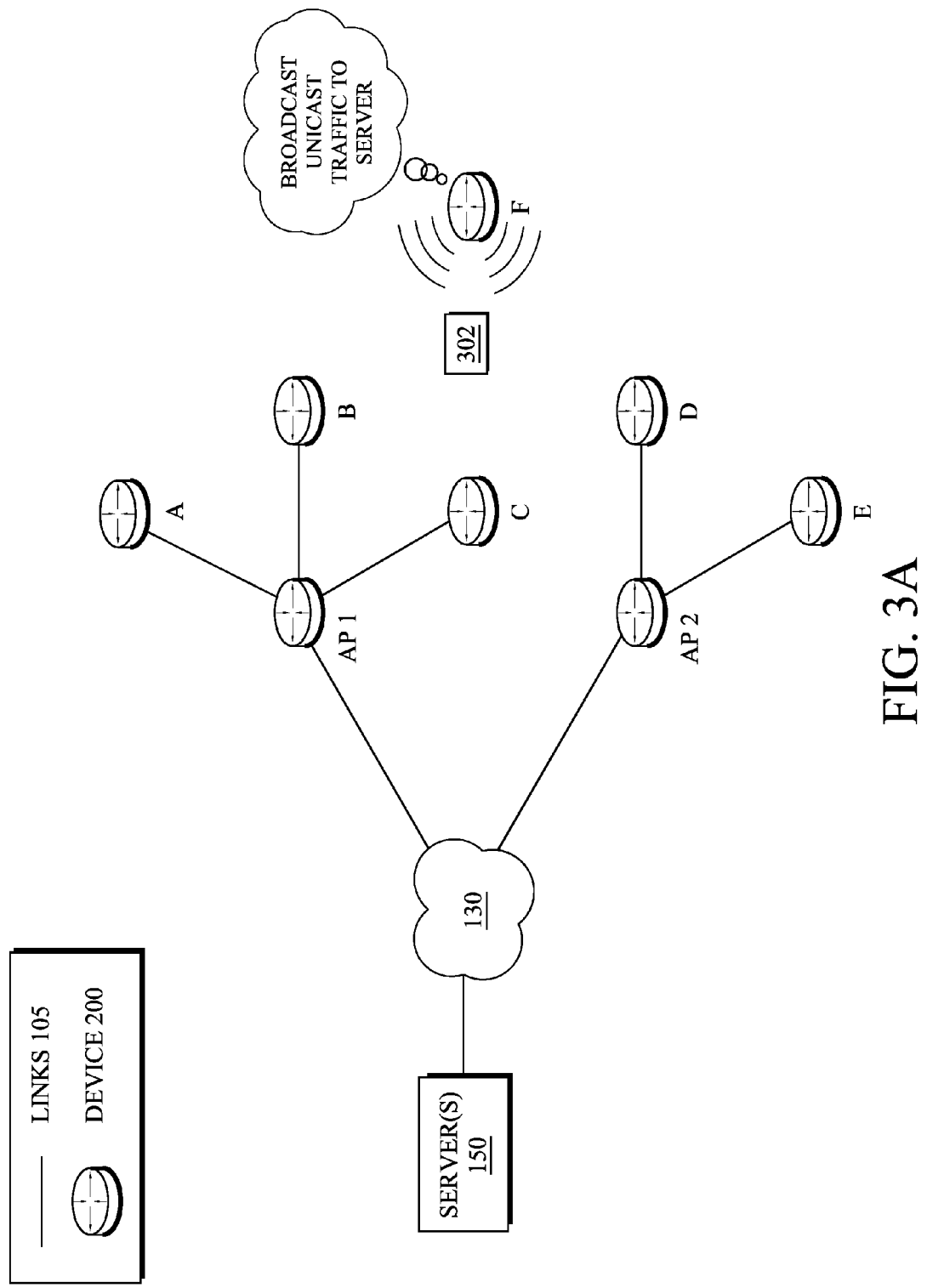
FIGS. 3A-3D illustrate examples of a network handling a communication message.

Operationally, the techniques herein may be applied to a network that uses repeaters, such as 802.11ah networks and the like. An example of such a network is illustrated in FIGS. 3A-3D, according to various embodiments. As shown in FIG. 3A, the network may include any number of APs, such as AP 1 and AP 2. Generally, AP 1 and AP 2 may be linked together as part of a hardwired and/or broadcast-based backbone (e.g., Ethernet, etc.). In turn, this backbone may be linked to other devices, such as servers 150, via a network 130 (e.g., via a gateway that provides WAN connectivity, etc.).

The network shown in FIG. 3A may also include any number of repeaters A-E (e.g., wireless relays) that extend the range of the APs to cover a larger area. For example, repeater A may be located within range of AP 1, thereby extending the range of AP 1. In various embodiments, APs 1-2 and repeaters A-E (e.g., devices 200) may be configured to store information regarding any communications that traverse these devices, such as information about deployed sensors that send sensor data using the network.

According to various embodiments, sensors and other sources of communications may operate in an adhoc manner within the network. In other words, the communication sources may not be attached to any specific AP or repeater, as in IEEE 802.11ah and similar protocols. For example, consider the case of a sensor/originating device F that is to send sensor data to server 150 via the network. As shown, sensor F may not be associated with any particular one of APs 1-2 or repeaters A-E.

When an originating device is to send a directed communication via the network, the device may do so by broadcasting the communication wirelessly. For example, sensor F may broadcast communication 302, thereby allowing any of the APs and/or repeaters in range to receive communication 302. In various embodiments, communication 302 may be a unicast packet or frame that is sent as a broadcast media access control (MAC) message. In one embodiment, communication 302 may include a unique identifier such as a token that includes the MAC address of sensor F and a sequence number.

Figure 3B:
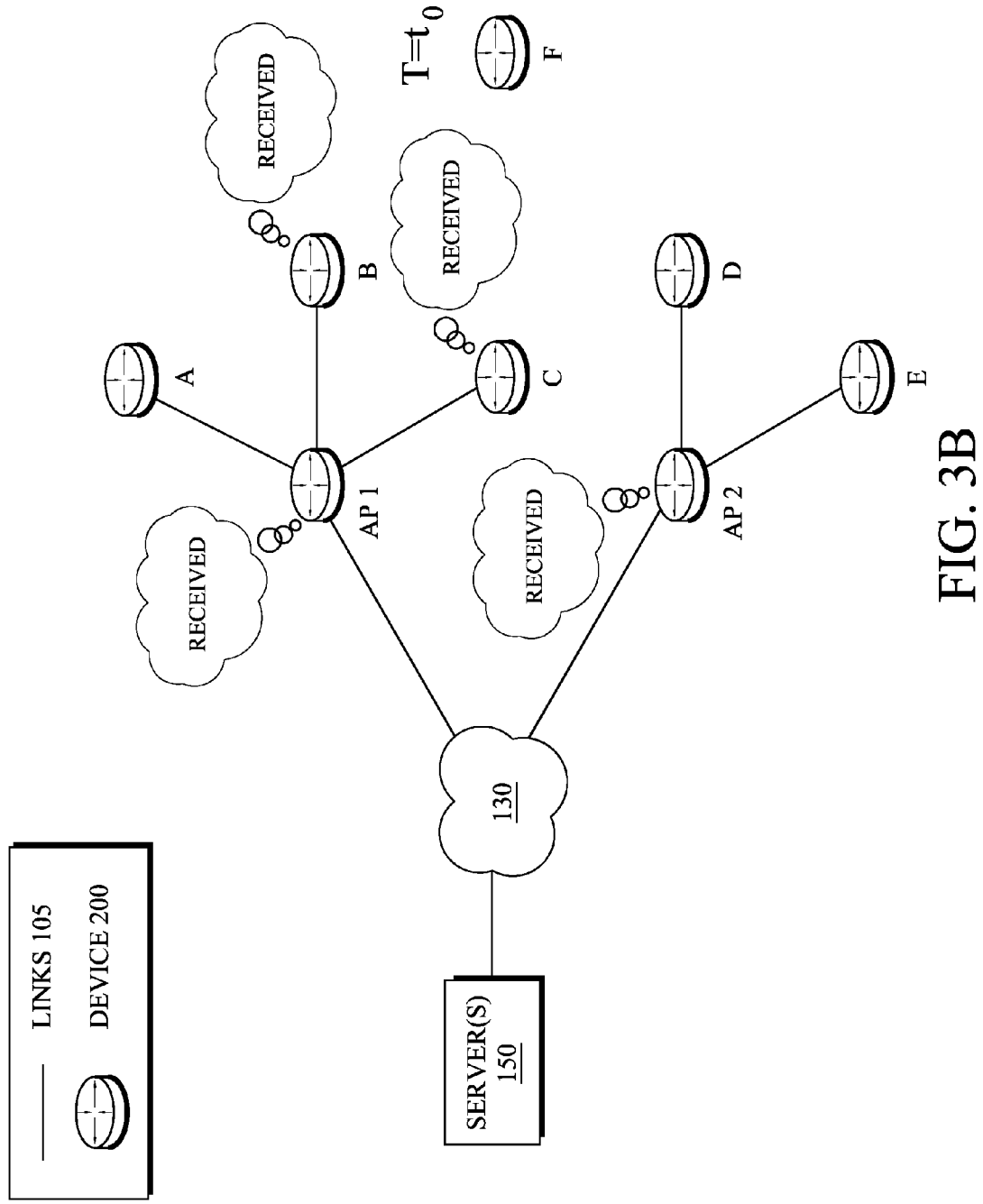

As shown in FIG. 3B, by using the air as a broadcast medium, any number of APs and/or repeaters in range of sensor F will receive communication 302. In various embodiments, a receiving device may use a timer-based mechanism to control when and if the device forwards communication 302. For example, the receiving devices may use Trickle timers, in some embodiments, to limit which of the receiving devices actually forwards communication 302 on towards its destination. The Trickle approach is outlined in the Internet Engineering Task Force (IETF) Request for Comments (RFC) 6206, entitled "The Trickle Algorithm," by Levis et al., the contents of which are incorporated by reference. In various embodiments, the Trickle approach may be modified to route unicast packets (roughly) towards a destination in a network.

In general, Trickle uses the following parameters: 1.) an interval size (I) in the range of $[I_{min}, I_{max}]$, 2.) a time (t) within the interval, and 3.) a counter (c) that is compared to a redundancy threshold/constant (k). After selecting the interval size, the device sets time t randomly within the interval (e.g., $I/2 \le t < I$). Each time the device receives a transmission that is "consistent," the device increments its counter c. At time t, if the counter is less than the redundancy threshold (e.g., c<k), the device retransmits the communication. When interval I expires, the device doubles its interval length, subject to the $I_{max}$ constraint. Additionally, if the device receives an "inconsistent" transmission at any time, it may reset its interval to $I_{min}$.

Traditionally, such as in 802.11ah, there is a short period of time after frame transmission for acknowledgement (ack) of a unicast frame. This is otherwise known as ARQ. In various embodiments, the receiving devices shown may use a longer ack period than in 802.11ah with a timer-based mechanism (e.g., Trickle, etc.), to allow multiple nodes to acknowledge receipt of the frame.

In various embodiments, the receiving devices may use variable time intervals, to control when and if a given receiver is to acknowledge or forward the communication. In some embodiments, nodes that are closer to the destination (e.g., the backbone linking APs 1-2, etc.) may have smaller Trickle intervals. For example, APs 1-2 attached to the Ethernet backbone may use an $I_{max}$ that is set to the same value as $I_{min}$ for repeaters A-E. In doing so, all grounded APs have the opportunity to acknowledge communication 302 before the first repeater (or mesh AP) does. In further embodiments, potential receivers may tune their intervals within their local $I_{min}$ and $I_{max}$ settings based in part on the signal quality of a received communication, making it statistically smaller with a better signal. In doing so, there is a better chance that the acknowledgement is well received in the other direction.

Figure 3C:
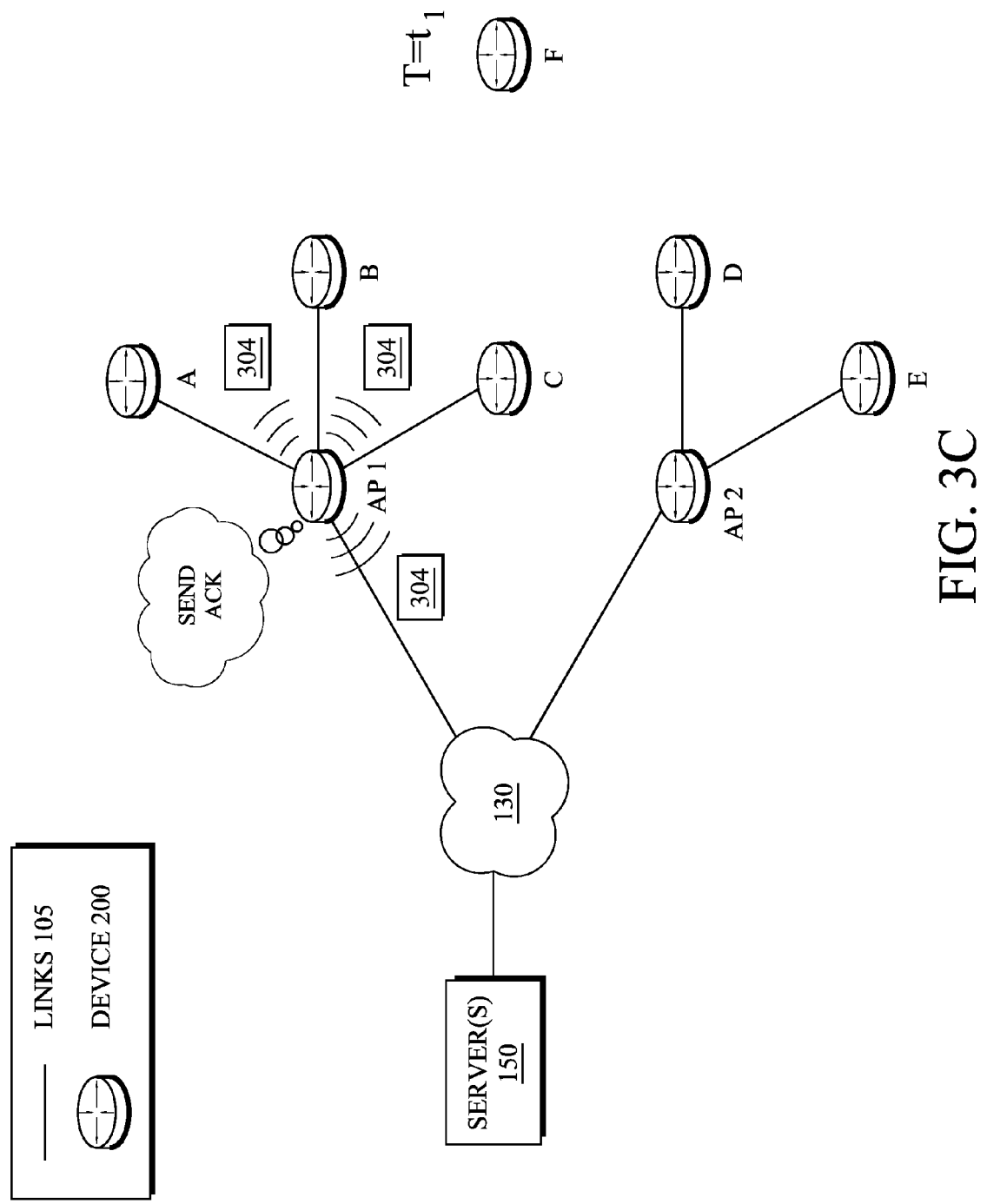

As shown in FIG. 3C, assume that AP 1 has the shortest time interval and is a recipient of communication 302 from sensor F. Accordingly, AP 1 may send out the first acknowledgement 304 from among the receiving devices. In some cases, AP 1 may broadcast acknowledgement 304 wirelessly (e.g., to any nearby repeaters) and/or via the backbone (e.g., via Ethernet broadcast to AP 2, etc.). In various embodiments, acknowledgement 304 may indicate the MAC address and sequence number included in the original communication 302.

After AP 1 acknowledges receipt of communication 302, the other devices that received communication 302 (e.g., AP 2 and repeaters B-C) may take a number of different actions. In some embodiments, if the redundancy constant k is set to be greater than one, the acknowledgement process may be repeated by the receiving devices that have the next shortest timers, until k-number of receivers acknowledge communication 302. In other words, a receiver may increment its counter c each time that it receives an acknowledgement 304 that includes the same MAC address and sequence as that of communication 302.

Since the local timers of the networking devices are based on their relative distances to the destination (and possibly the signal strength), only the k-number of devices closest to the destination will acknowledge communication 302. These devices will then repeat their copy of communication 302 via broadcast. For example, AP 1 may repeat communication 302 on the backbone (e.g., via Ethernet), while any repeaters in the k-number of devices may repeat communication 302 as a wireless broadcast.

Figure 3D:
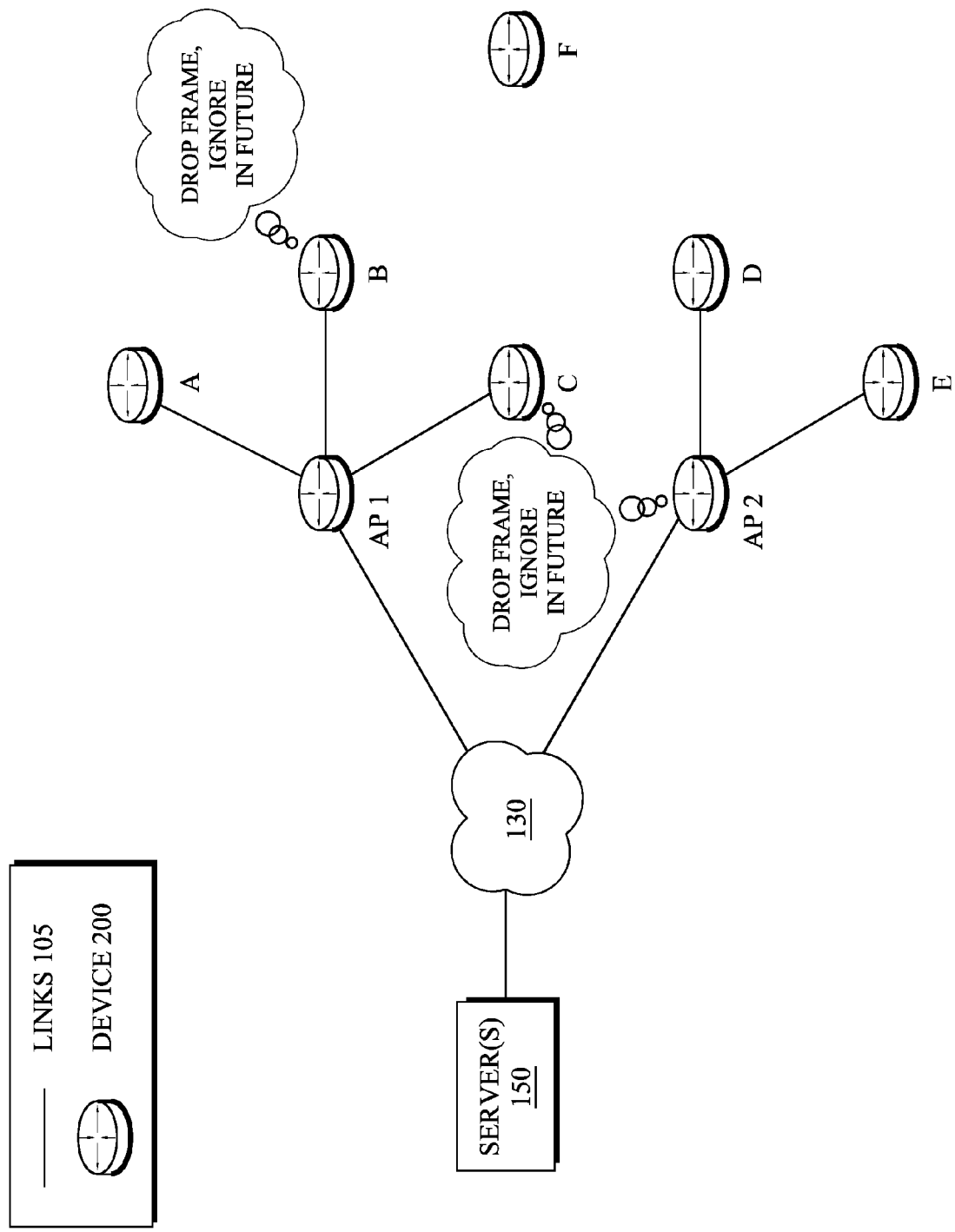

As shown in FIG. 3D, any receiver of communication 302 that is outside of the k-number of receivers may drop their copy of the frame/communication 302 when their local timers expire. For example, repeaters A-B may flush the corresponding frame from their memories and ignore any future copies of the same frame in the future. Similarly, the same goes for an AP when it receives a broadcast copy over the backbone link (e.g. Ethernet used as a broadcast medium) from another AP. For example, AP 2 may flush its copy of communication 302 based on its receipt of acknowledgement 304.

Figure 4A:
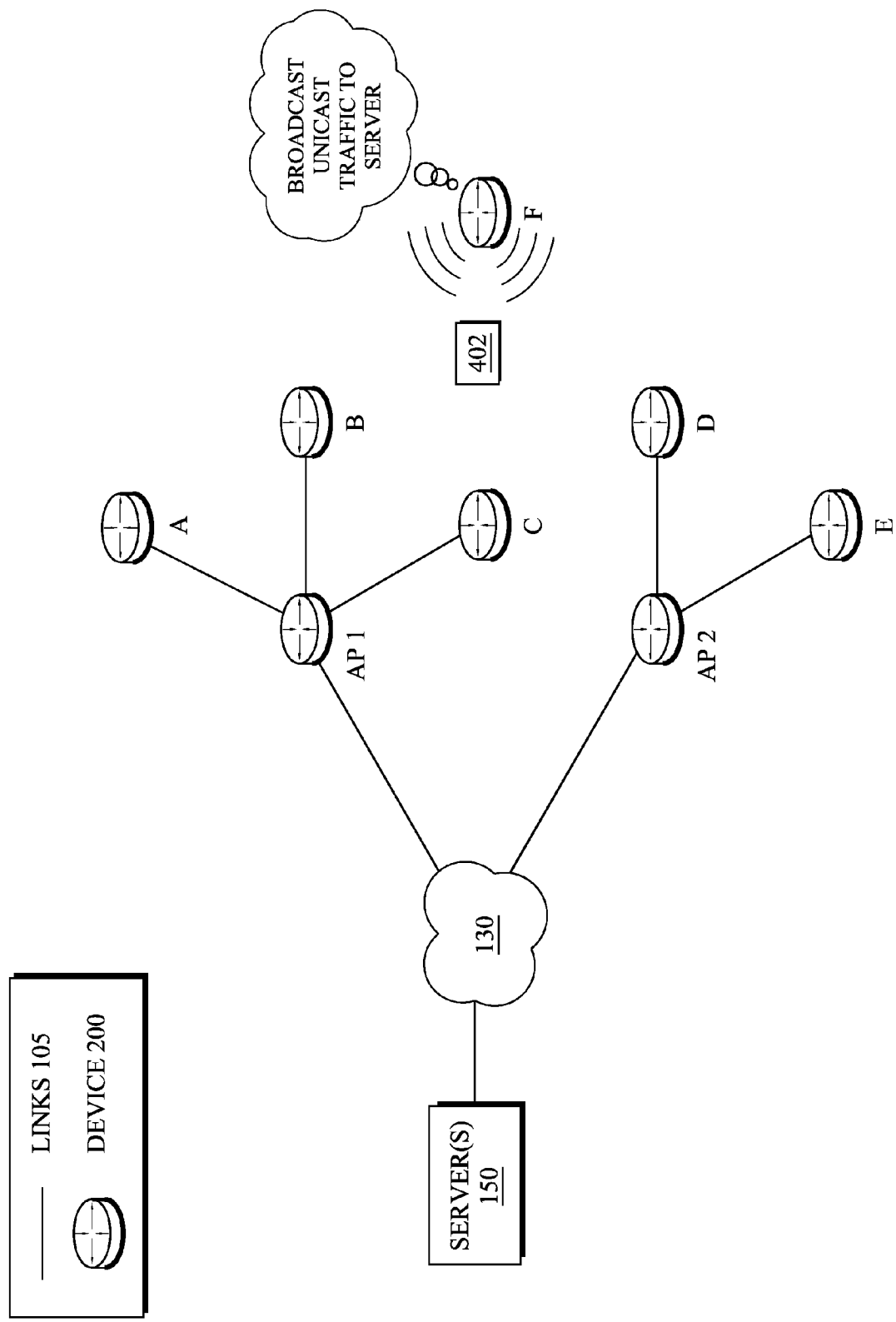
FIGS. 4A-4F illustrate further examples of a network handling a communication message.
Figure 4B:
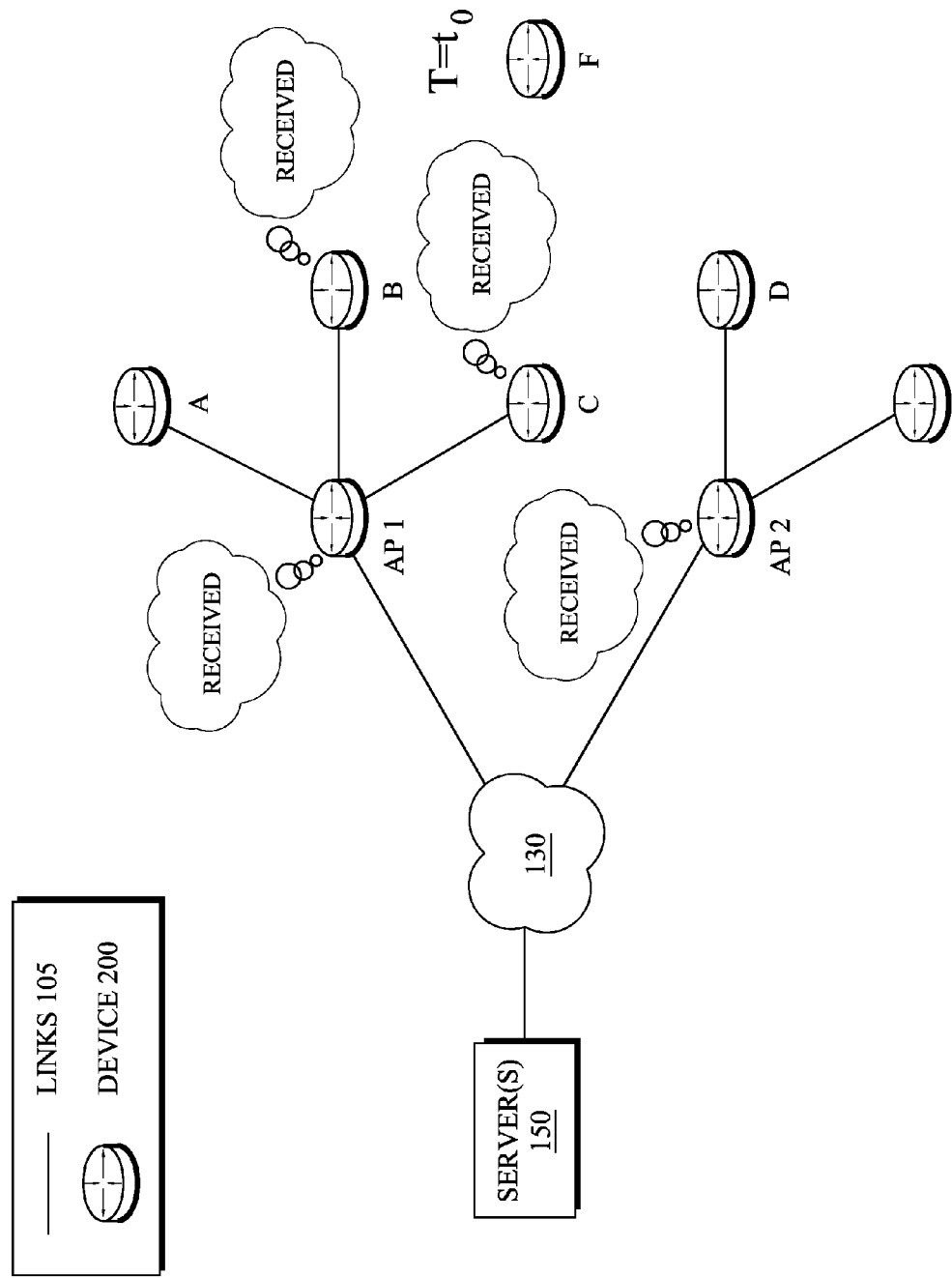

FIGS. 4A-4F illustrate further examples of the network handling a communication message, according to various embodiments. In FIG. 4A, similar to the example illustrated in FIG. 3A, assume that sensor F sends a communication 402 as a unicast packet destined for server 150 via wireless broadcast. However, in the current scenario assume that only repeaters B-D received communication 402, as shown in FIG. 4B.

Figure 4C:
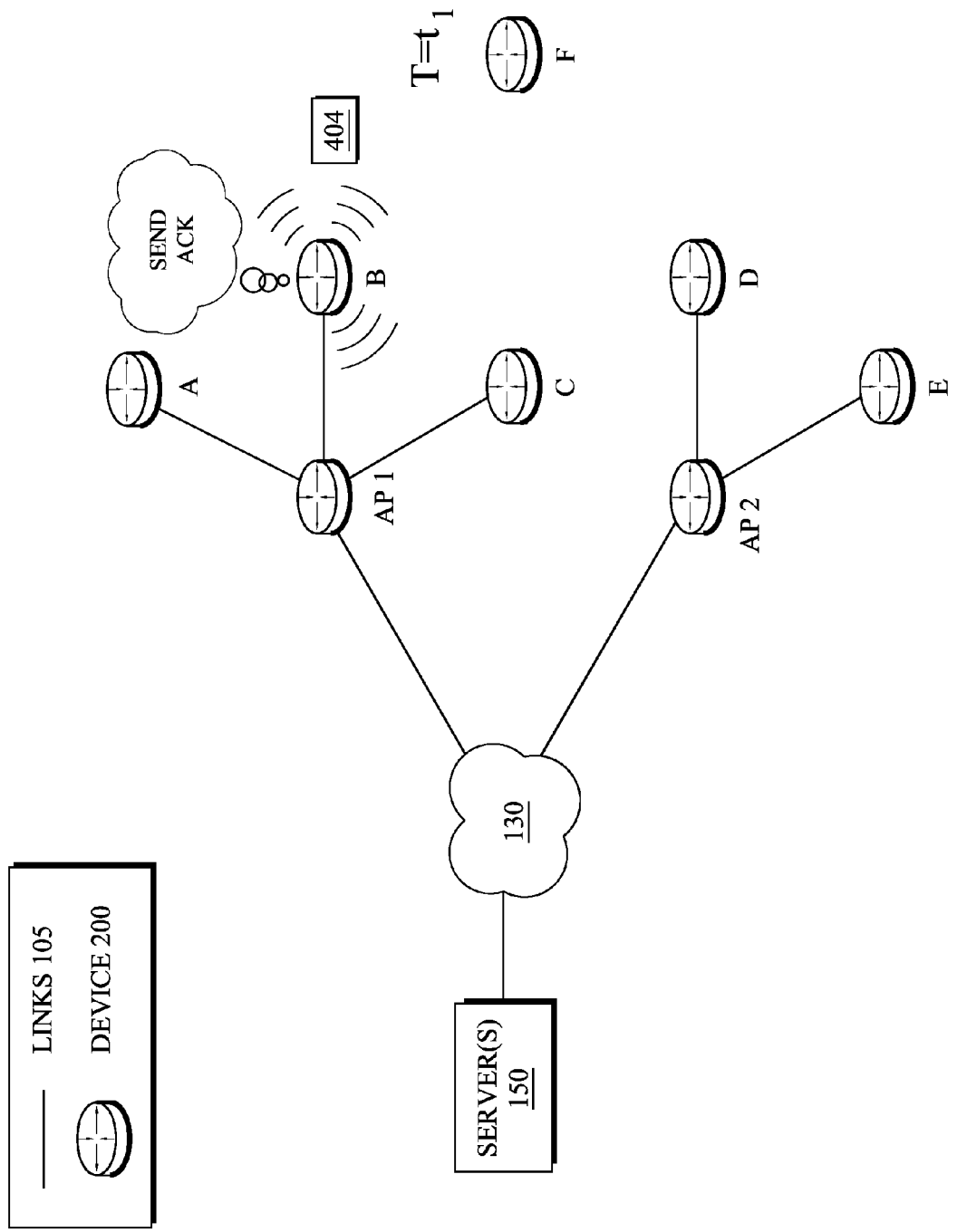

Assume for purposes of illustration that redundancy constant k=2 in the network. As shown in FIG. 4C, repeater B may send acknowledgement 404 at time $T=t_1$, based on its own internal timer. In particular, acknowledgement 404 may include the MAC address and sequence number included in communication 402 and may be a broadcast message. In turn, the devices that receive acknowledgement 404 may update their local counts, accordingly.

Figure 4D:
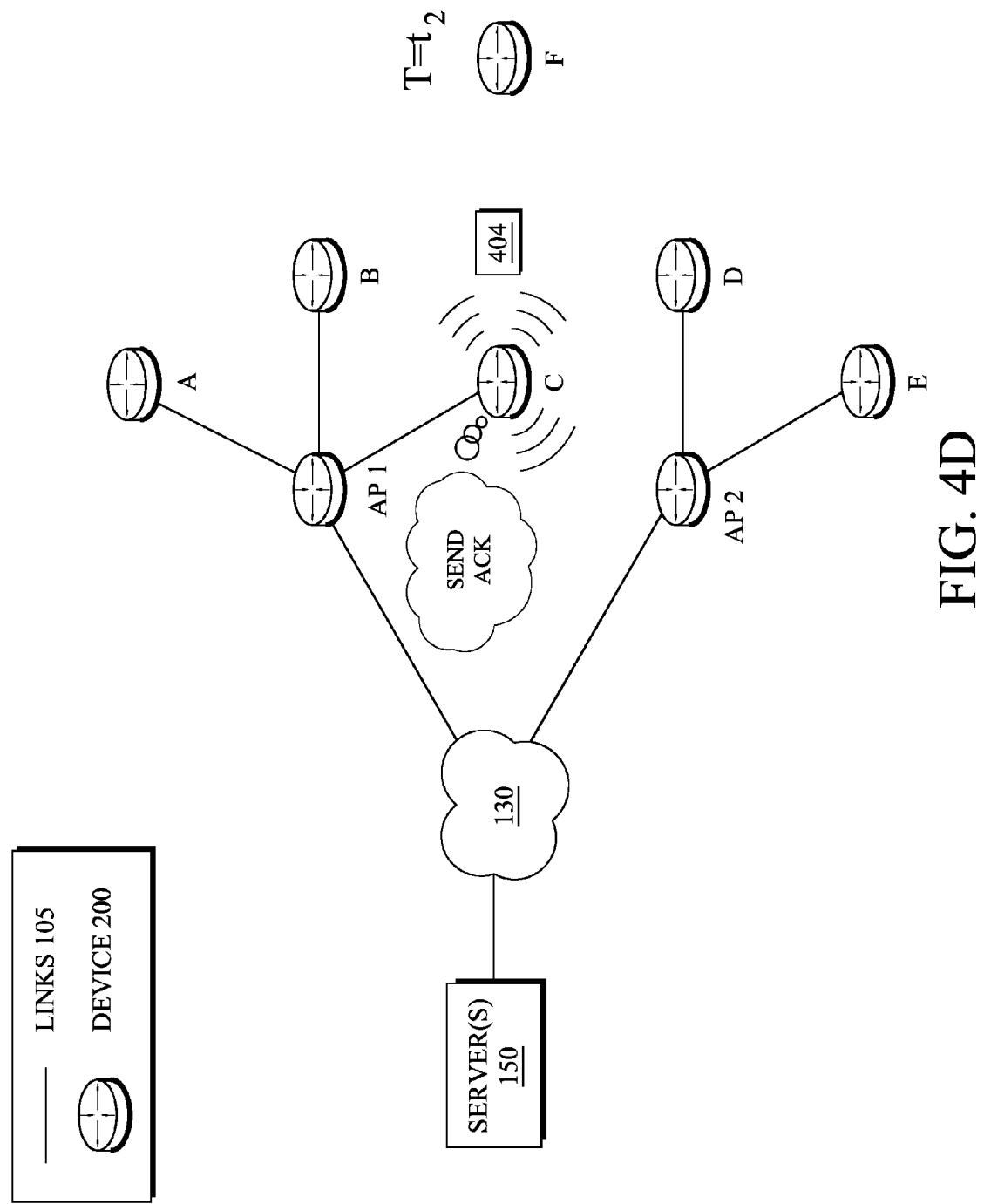

In FIG. 4D, since the local counts of the remaining receivers of communication 402 are less than the redundancy constant (i.e., c<k), the device with the next shortest timer will then send its own acknowledgement. For example, at time $T=t_2$, repeater C may broadcast its own acknowledgement 404. In turn, any of the remaining receivers of both communication 402 and acknowledgement 404 will update their local counts.

Figure 4E:
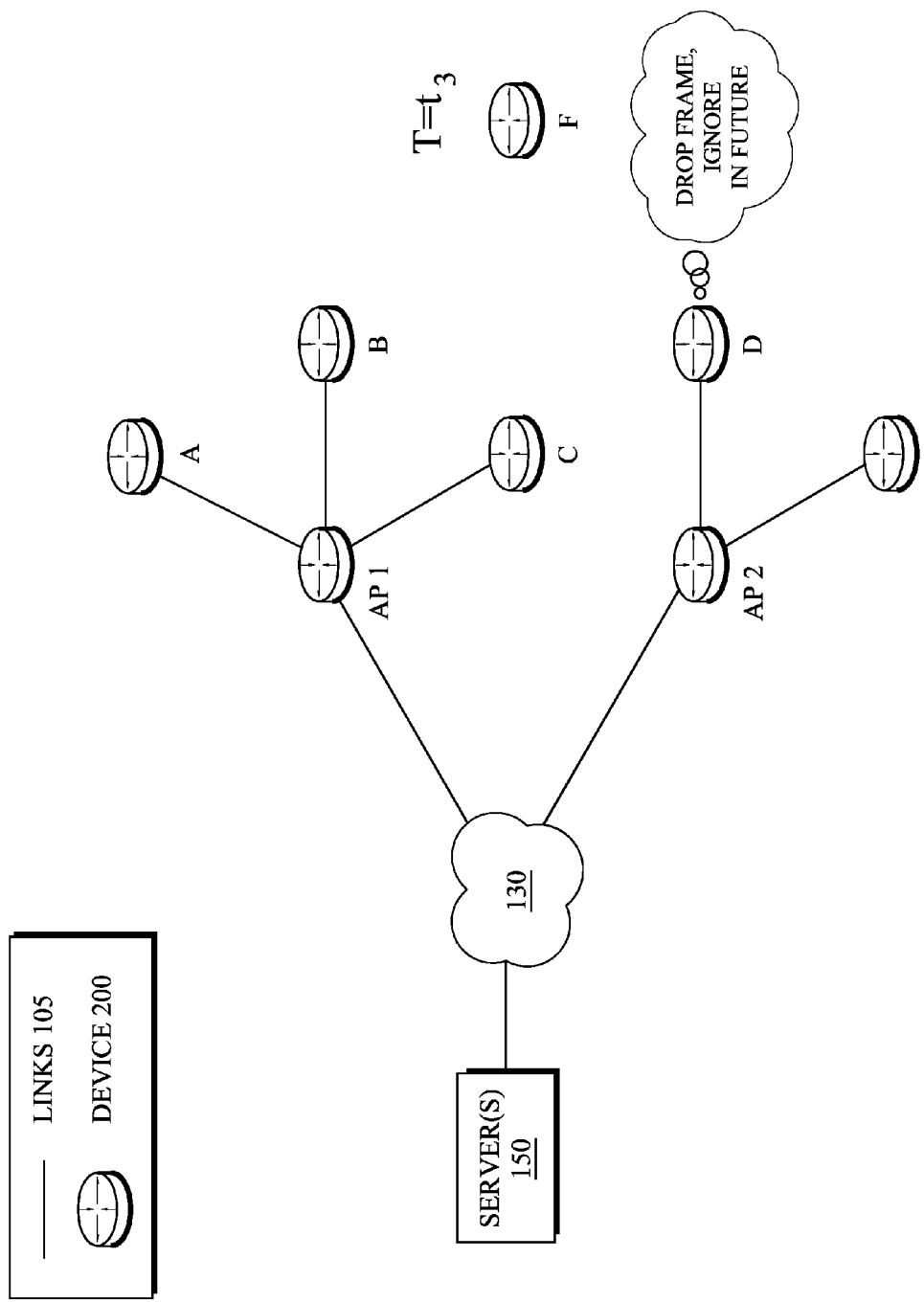

In FIG. 4E, if the acknowledgement count reaches the threshold redundancy constant, any remaining devices that have not yet acknowledged communication 402 may drop communication 402 and ignore any future repeats of the frame. For example, at time $T=t_3$, since repeaters B-C have already acknowledged communication 402 and k=2, repeater D may drop its own copy of communication 402 and ignore any future copies of the frame that repeater D may encounter.

Figure 4F:
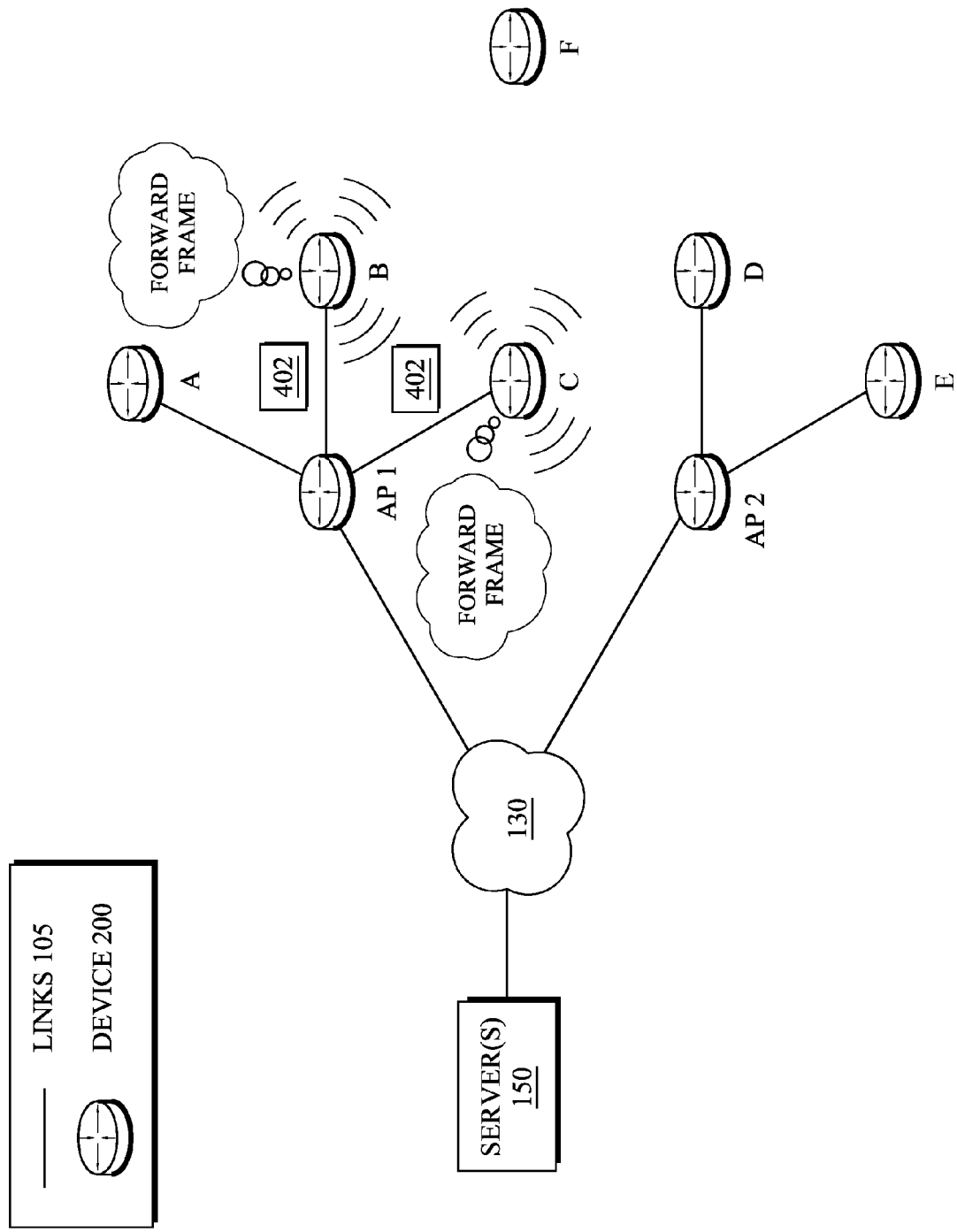

In FIG. 4F, repeaters B-C may then repeat the forwarding process by respectively broadcasting communication 402. During this time, if repeater D receives a copy of communication 402, it may ignore the frame. However, other devices that did not previously encounter communication 402 may process communication 402 using the techniques outlined above. For example, if AP 1 now receives a copy of communication 402, it may use its own respective timer to control whether or not it acknowledges communication 402 and, if so, forwards communication 402, accordingly.

As would be appreciated, the techniques herein can be used in any number of different network configurations. For example, the techniques herein can also be used to send communications recursively along a route or inside a multi-hop mesh, in addition to networks that use repeaters.

Figure 5:
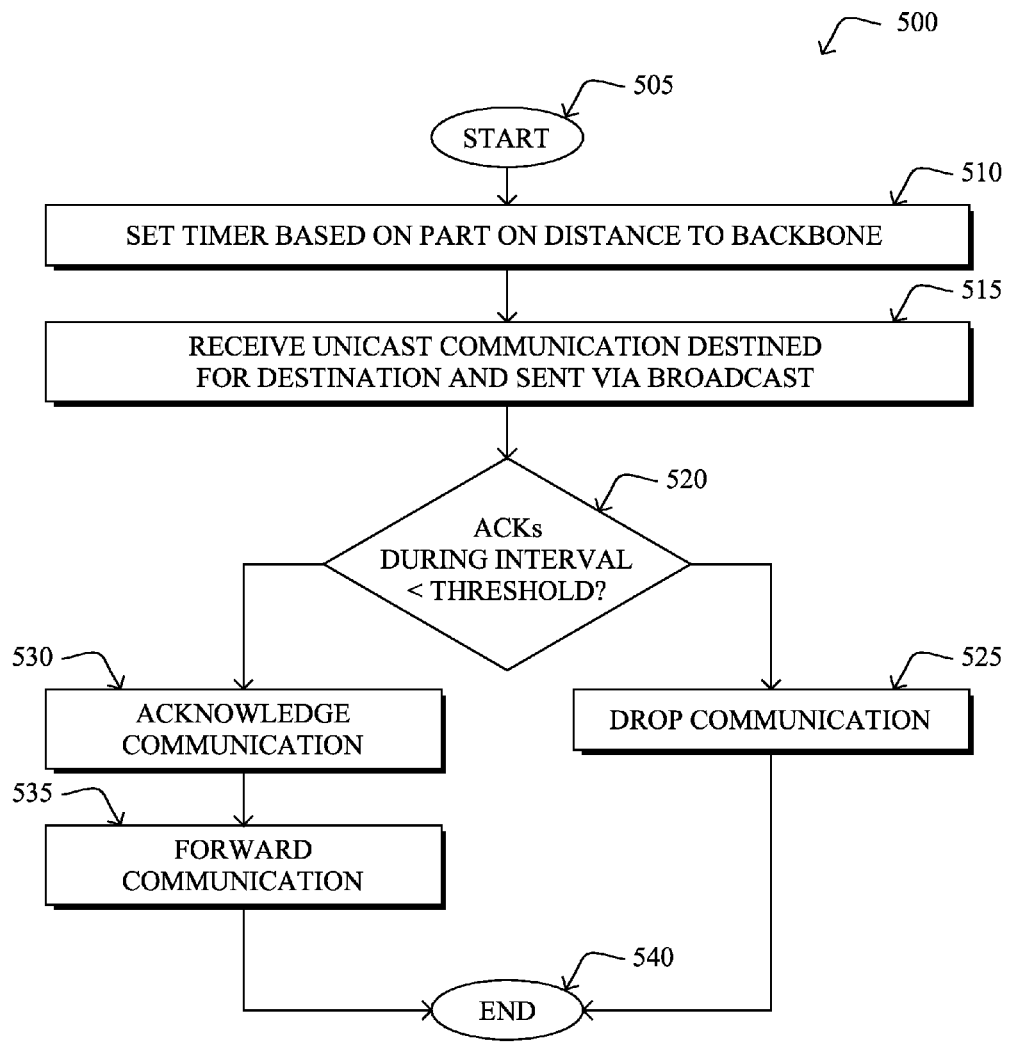
FIG. 5 illustrates an example simplified procedure for processing a communication in a network.

FIG. 5 illustrates an example simplified procedure for processing a communication in a network, in accordance with one or more embodiments described herein. Generally, procedure 500 may be performed by a specifically configured networking device (e.g., device 200) by executing stored instructions. For example, an AP or repeater may perform procedure 500 by executing stored instructions. Procedure 500 may start at step 505, and continues to step 510, where, as described in greater detail above, the device sets a timer interval based on its distance to a network backbone. In various cases, the backbone may comprise a set of specific networking devices. For example, the backbone may comprise a set of APs connected via Ethernet or another communication medium. Generally, the distance to the backbone may be quantified in terms of physical distance, number of hops, signal strength to an AP on the backbone, or the like. For example, if the device is one of the backbone devices, it may set its timer interval such that its own timer interval is lower than a repeater that is not on the backbone. In various embodiments, the timer intervals of the devices may be set based in part on a maximum allowed amount of latency for the network (e.g., $I_{max}$ may be set based on the allowed amount of latency).

At step 515, as detailed above, the device may receive a unicast communication destined for a destination device and sent via broadcast. For example, a sensor may send sensor data destined for a server as a unicast packet, but broadcast wirelessly. Such a communication may include the MAC address of the sender and a sequence number, allowing any receivers the particular communication/frame to identify the frame uniquely.

At step 520, the device may make a determination as to whether the number of other devices in the network that acknowledged the communication is below a threshold number. For example, assume that the threshold dictates that only three devices in the network should forward the communication redundantly. If the device encounters three acknowledgements of the communication before its own timer expires, the device may determine that the threshold was reached and procedure 500 may continue on to step 525. However, if the device determines that less than the threshold number of devices acknowledged the communication prior to expiration of its local timer, procedure 500 may continue on to step 530.

At step 525, as detailed above, if the device determines that the threshold number of devices acknowledged the communication prior to when the device would itself acknowledge the communication (e.g., at the end of its own timer interval), the device may drop the communication and/or ignore any further copies of the communication received at a future time. Procedure 500 then ends at step 540.

At step 530, as detailed above, if the device determines that not enough acknowledgements were received prior to expiration of its own timer, the device may send out its own acknowledgement. In various embodiments, the device may broadcast the acknowledgement (e.g., wirelessly, via the backbone, etc.). The acknowledgement may include the same identifies as that of the communication, such as the MAC address of the original sender of the communication, a frame sequence number, etc.

At step 535, the device may also forward the communication, as described in greater detail above. In particular, after acknowledging receipt of the communication in step 530, the device may then attempt to forward the communication on towards its destination. In some embodiments, the device may forward the communication as a unicast packet via broadcast, allowing the packet to continue propagating in a directed manner towards its destination. Procedure 500 then ends at step 540.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a device to leverage its radio transceiver by using a local broadcast medium to increase reliability within latency boundaries, in contrast to other techniques, such as ARQ. In some aspects, Trickle-timers may be used for both the acknowledgment and forwarding of the communication, so that only a limited number of devices repeat the communication at each hop. Further the techniques herein do not tie a device to a particular AP or repeater, allowing the device to move freely within the covered zone and without the need to re-associate itself to any particular AP or repeater.

While there have been shown and described illustrative embodiments that provide for reliable and connectionless communications in a network, it is to be understood that various other adaptations and modifications may be made within the spirit and scope of the embodiments herein. For example, the embodiments have been shown and described herein with relation to certain network configuration. However, the embodiments in their broader sense are not as limited, and may, in fact, be used with other types of networks and/or protocols (e.g., wireless).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   setting, by a device in a network, a timer interval based in part on a distance between the device and a backbone of the network;
   receiving, at the device, a unicast communication destined for a remote destination that was sent via broadcast;
   determining, by the device, a count of receipt acknowledgements of the communication sent by other devices in the network; and
   at the end of the timer interval, sending by the device, a receipt acknowledgement of the communication via broadcast, in response to the count of receipt acknowledgements sent by other devices in the network being below a threshold amount.

2. The method as in claim 1, further comprising:
   setting, by the device, the timer interval based in part on a signal quality of the received communication.

3. The method as in claim 1, further comprising:
   sending, by the device, the communication via broadcast, in response to the count of receipt acknowledgements sent by other devices in the network being below a threshold amount.

4. The method as in claim 1, wherein the device is a wireless access point that is part of the backbone, and wherein the device sends the receipt acknowledgement over the backbone as an Ethernet broadcast.

5. The method as in claim 1, wherein the device is a wireless repeater, and wherein the device sends the receipt acknowledgement over the backbone as a wireless broadcast.

6. The method as in claim 1, further comprising:
   determining, by the device, that receipt of a second communication was acknowledged by a device in the backbone; and
   in response to determining that the device in the backbone acknowledged receipt of the second communication, ignoring further frames of the second communication.

7. The method as in claim 1, wherein determining the count of receipt acknowledgements sent by other devices in the network comprises:
   matching, by the device, a media access control (MAC) address and sequence number in the received communication to a MAC address and sequence number in the receipt acknowledgements sent by other devices in the network, wherein the MAC addresses correspond to an originating device of the communication.

8. The method as in claim 7, wherein the originating device is a sensor and wherein the communication comprises sensor data.

9. The method as in claim 1, wherein the timer interval is a Trickle interval.

10. An apparatus, comprising:
    one or more network interfaces to communicate with a network;
    a processor coupled to the network interfaces and configured to execute one or more processes; and
    a memory configured to store a process executable by the processor, the process when executed operable to:
    set a timer interval based in part on a distance between the device and a backbone of the network;
    receive a unicast communication destined for a remote destination that was sent via broadcast;
    determine a count of receipt acknowledgements of the communication sent by other devices in the network; and
    at the end of the timer interval, send a receipt acknowledgement of the communication via broadcast, in response to the count of receipt acknowledgements sent by other devices in the network being below a threshold amount.

11. The apparatus as in claim 10, wherein the process when executed is further operable to:

set the timer interval based in part on a signal quality of the received communication.

12. The apparatus as in claim 10, wherein the process when executed is further operable to:
send the communication via broadcast, in response to the count of receipt acknowledgements sent by other devices in the network being below a threshold amount.

13. The apparatus as in claim 10, wherein the apparatus is a wireless access point that is part of the backbone, and wherein the apparatus sends the receipt acknowledgement over the backbone as an Ethernet broadcast.

14. The apparatus as in claim 10, wherein the apparatus is a wireless repeater, and wherein the apparatus sends the receipt acknowledgement over the backbone as a wireless broadcast.

15. The apparatus as in claim 10, wherein the process when executed is further operable to:
determine that receipt of a second communication was acknowledged by a device in the backbone; and
in response to determining that the device in the backbone acknowledged receipt of the second communication, ignore further frames of the second communication.

16. The apparatus as in claim 10, wherein the apparatus determines the count of receipt acknowledgements sent by other devices in the network by matching a media access control (MAC) address and sequence number in the received communication to a MAC address and sequence number in the receipt acknowledgements sent by other devices in the network, wherein the MAC addresses correspond to an originating device of the communication.

17. The apparatus as in claim 16, wherein the originating device is a sensor and wherein the communication comprises sensor data.

18. The apparatus as in claim 10, wherein the timer interval is a Trickle interval.

19. A tangible, non-transitory, computer-readable media having software encoded thereon, the software when executed by a processor operable to:
set a timer interval based in part on a distance between the device and a backbone of the network;
receive a unicast communication destined for a remote destination that was sent via broadcast;
determine a count of receipt acknowledgements of the communication sent by other devices in the network; and
at the end of the timer interval, send a receipt acknowledgement of the communication via broadcast, in response to the count of receipt acknowledgements sent by other devices in the network being below a threshold amount.

20. The computer-readable media as in claim 19, wherein the software when executed is further operable to: set the timer interval based in part on a signal quality of the received communication.

\* \* \* \* \*